(12) United States Patent
Lee et al.

(10) Patent No.: US 9,311,039 B2
(45) Date of Patent: Apr. 12, 2016

(54) CLOUD PRINTING SYSTEM AND METHOD USING IMAGE FORMING APPARATUS

(71) Applicant: SAMSUNG ELECTRONICS CO., LTD., Suwon (KR)

(72) Inventors: Jae-in Lee, Suwon (KR); Dae-hyun Kim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/247,542

(22) Filed: Apr. 8, 2014

(65) Prior Publication Data

US 2015/0049359 A1    Feb. 19, 2015

(30) Foreign Application Priority Data

Aug. 19, 2013    (KR) ......................... 10-2013-0098130

(51) Int. Cl.
  *G06K 15/00*    (2006.01)
  *G06F 3/12*    (2006.01)
  *H04B 5/00*    (2006.01)
  *H04W 4/00*    (2009.01)
  *H04L 29/08*    (2006.01)

(52) U.S. Cl.
  CPC .............. *G06F 3/1292* (2013.01); *G06F 3/122* (2013.01); *G06F 3/1203* (2013.01); *G06F 3/1204* (2013.01); *G06F 3/1267* (2013.01); *G06F 3/1268* (2013.01); *G06F 3/1288* (2013.01); *H04B 5/0031* (2013.01); *H04L 67/02* (2013.01); *H04W 4/008* (2013.01); *G06F 3/1222* (2013.01); *G06F 3/1226* (2013.01); *G06F 3/1238* (2013.01)

(58) Field of Classification Search
  USPC ........ 358/1.15, 1.13, 1.3, 1.14, 468, 400, 404
  See application file for complete search history.

(56) References Cited

U.S. PATENT DOCUMENTS

| 2009/0096413 | A1 | 4/2009 | Partovi et al. | |
| 2012/0167118 | A1* | 6/2012 | Pingili et al. | 719/318 |
| 2012/0262753 | A1 | 10/2012 | Viccari et al. | |
| 2014/0313539 | A1* | 10/2014 | Kawano | 358/1.14 |

(Continued)

FOREIGN PATENT DOCUMENTS

| JP | 2012-64030 | 3/2012 |
| WO | 2013/059190 A1 | 4/2013 |

OTHER PUBLICATIONS

European Office Action dated Feb. 2, 2015 in corresponding European Patent Application No. 14168800.2.

(Continued)

*Primary Examiner* — Jerome Grant, II
(74) *Attorney, Agent, or Firm* — Staas & Halsey LLP

(57) ABSTRACT

A cloud printing method using a image forming apparatus includes selecting content for printing in a mobile terminal and connecting a location storage server and receiving location information of image forming apparatuses via the mobile terminal. The method also included displaying locations of the image forming apparatuses on a screen of the mobile terminal, based on the received location information and transmitting the content to a cloud server via the mobile terminal. The method further includes near field communication tagging the mobile terminal to a selected one of the image forming apparatuses and receiving the content from the cloud server and printing the content, via the selected one of the image forming apparatuses with respect to which the near field communication tagging is performed.

20 Claims, 13 Drawing Sheets

(56) References Cited

U.S. PATENT DOCUMENTS

2015/0038006 A1* 2/2015 Jansen et al. ................ 439/535
2015/0038086 A1* 2/2015 Kim ............................ 455/41.3
2015/0049360 A1* 2/2015 Lee et al. .................... 358/1.15

OTHER PUBLICATIONS

European Search Report dated Jan. 8, 2015 in corresponding European Patent Application No. 14168800.2.

* cited by examiner

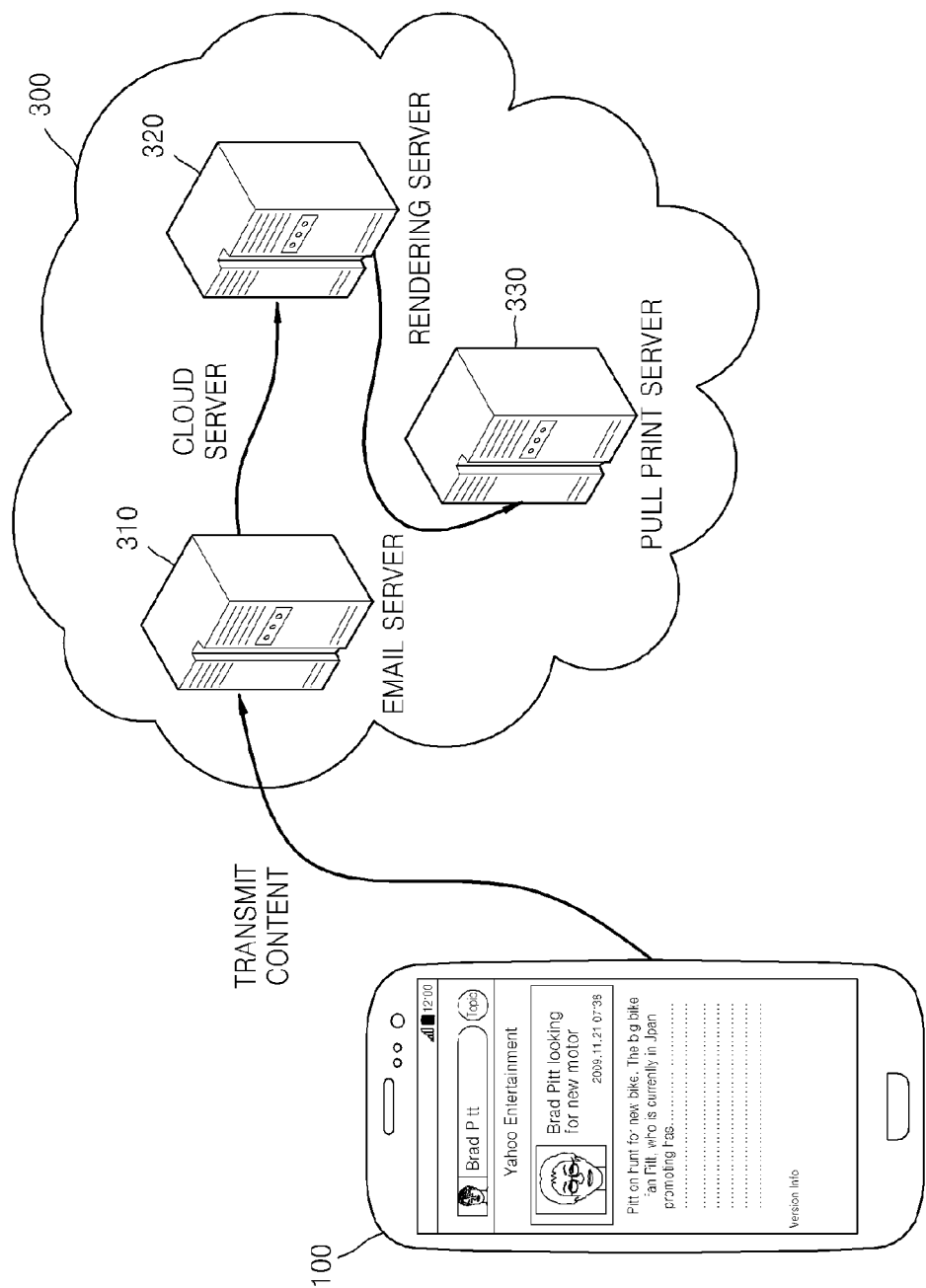

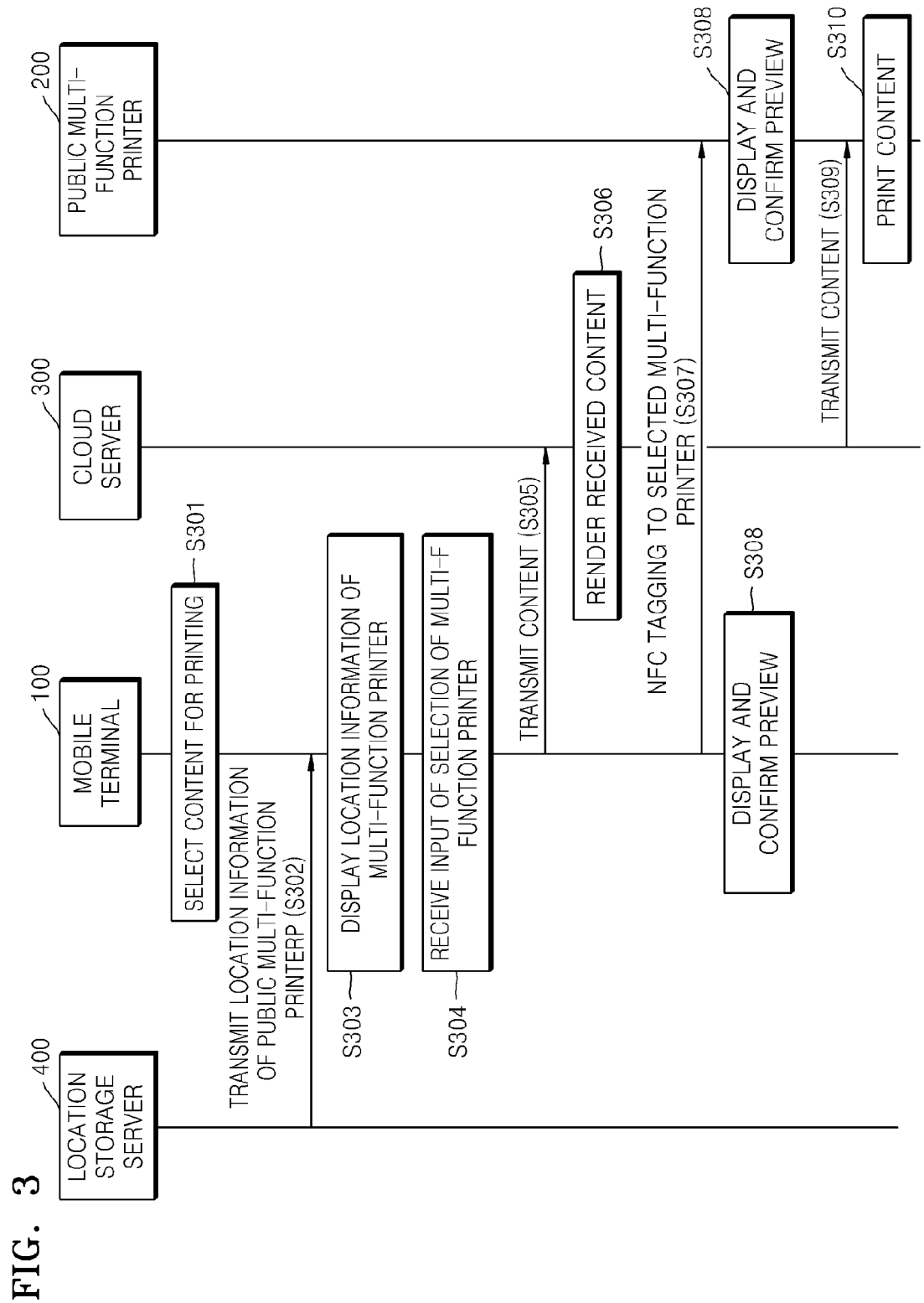

CLOUD PRINTING SYSTEM AND METHOD USING IMAGE FORMING APPARATUS

CROSS-REFERENCE TO RELATED APPLICATIONS

This application claims the benefit of Korean Patent Application No. 10-2013-0098130, filed on Aug. 19, 2013, in the Korean Intellectual Property Office, the disclosure of which is incorporated herein in its entirety by reference.

BACKGROUND

1. Field

One or more embodiments of the present invention relate to a cloud printing system and method using an image forming apparatus or may be a public image forming apparatus.

2. Description of the Related Art

With developments of mobile communication technologies and the widespread use of mobile communication terminals, mobile terminals, such as smart phones, tablet personal computers (PCs), and personal digital assistants (PDAs), are replacing the role of previous PCs. Accordingly, interests in a cloud printing technology using the mobile terminals are increasing.

Cloud printing refers to a technology for directly performing printing in a printer connected in a network, when mobile terminals, such as cellular phones or tablet PCs, request the print operation. In a cloud printing environment, a mobile terminal, a printer, and a cloud server are connected by a wireless network, and perform transmitting and receiving of information with respect to printing.

In detail, when the mobile terminal identifies content stored in the cloud server and requests a print of the content, the cloud server transmits the content for which the print is requested to the printer that performs the print of the content. Or, when a print of content stored in the mobile terminal is requested, the mobile terminal transmits the content to the cloud server, and, the cloud server transmits the content to the printer and requests the print of the content.

Since a cloud printing service may perform printing by transmitting print data via the wireless network, the cloud printing service is provided by using not only a personal printer but also a public printer. Like this, when the public printer is used, there is required a method of supporting a user to easily search for the public printer that he or she may conveniently use and to make the searched public printer perform the printing.

SUMMARY

One or more embodiments of the present invention include a cloud printing method and system using a public image forming apparatus supporting near field communication (NFC).

Additional aspects will be set forth in part in the description which follows and, in part, will be apparent from the description, or may be learned by practice of the presented embodiments.

According to one or more embodiments of the present invention, a cloud printing method using a image forming apparatus includes: selecting content for printing in a mobile terminal; connecting a location storage server and receiving location information of image forming apparatuses via the mobile terminal; displaying locations of the image forming apparatuses on a screen of the mobile terminal, based on the received location information; transmitting the content to a cloud server via the mobile terminal; near field communication (NFC) tagging the mobile terminal to one of the image forming apparatuses; and receiving the content from the cloud server and printing the content via the NFC tagged image forming apparatus.

The cloud server may include an email server, a rendering server, and a pull print server, and, the transmitting of the content may include transmitting an email including the selected content to the email server.

The rendering server may receive the content included in the email from the email server, perform rendering of the received content, and transmit the rendered content to the pull print server.

The pull print server may receive the rendered content from the rendering server and store the rendered content.

The receiving and printing of the content may include receiving the rendered content which is stored in the pull print server and printing the rendered content, via the NFC tagged image forming apparatus.

The receiving and printing of the content may include receiving apparatus information from the NFC tagged image forming apparatus, via the mobile terminal; transmitting the received apparatus information to the pull print server via the mobile terminal; and transmitting the rendered content to the image forming apparatus that corresponds to the received apparatus information via the pull print server.

The transmitting of the content may include transmitting the content to the could server via the mobile terminal, when the one of the image forming apparatuses displayed on the screen of the mobile terminal is selected as an apparatus for performing printing.

The receiving and printing of the content may include: displaying a preview of the content in either of the mobile terminal and the NFC tagged image forming apparatus; transmitting the content to the NFC tagged image forming apparatus via the cloud server, when an input of a confirmation of the preview is received from a user; and printing the content via the NFC tagged image forming apparatus.

According to one or more embodiments of the present invention, a cloud printing system using a image forming apparatus includes: a plurality of image forming apparatuses that support near field communication (NFC) and are for printing content received form a cloud server; a mobile terminal that supports the NFC and is for receiving location information of the plurality of image forming apparatuses from a location storage server and displaying the location information on a screen; and the cloud server that renders and stores the content transmitted from the mobile terminal, wherein, when the mobile terminal is NFC tagged to one of the plurality of image forming apparatuses, the cloud server may transmit the stored content to the NFC tagged image forming apparatus.

The cloud server may include an email server, a rendering serer, and a pull print server, and, the mobile terminal may transmit the email including the content to the email server.

The rendering server may receive the content included in the email from the email server, perform rendering of the received content, and transmit the rendered content to the pull print server.

The pull print server may receive the rendered content from the rendering server and store the rendered content.

The NFC tagged image forming apparatus may receive and print the rendered content which is stored in the pull print server.

The mobile terminal may receive apparatus information from the NFC tagged image forming apparatus and transmit the received apparatus information to the pull print server.

The pull print server may transmit the rendered content to the image forming apparatus that corresponds to the received apparatus information.

The mobile terminal receives an input for selecting an image forming apparatus for performing printing among the plurality of image forming apparatuses displayed on its screen.

The mobile terminal and/or the NFC tagged image forming apparatus may display a preview of the content. When an input of a confirmation of the preview is received from a user, the NFC tagged image forming apparatus may receive the content from the cloud server and print the content.

BRIEF DESCRIPTION OF THE DRAWINGS

These and/or other aspects will become apparent and more readily appreciated from the following description of the embodiments, taken in conjunction with the accompanying drawings in which:

FIGS. 2A through 2E are views illustrating operations of a could printing method using a image forming apparatus according to an embodiment of the present invention;

FIGS. 3 and 4 are views illustrating operations of components included in a cloud printing system using a image forming apparatus according to embodiments of the present invention.

DETAILED DESCRIPTION

Figure 1:
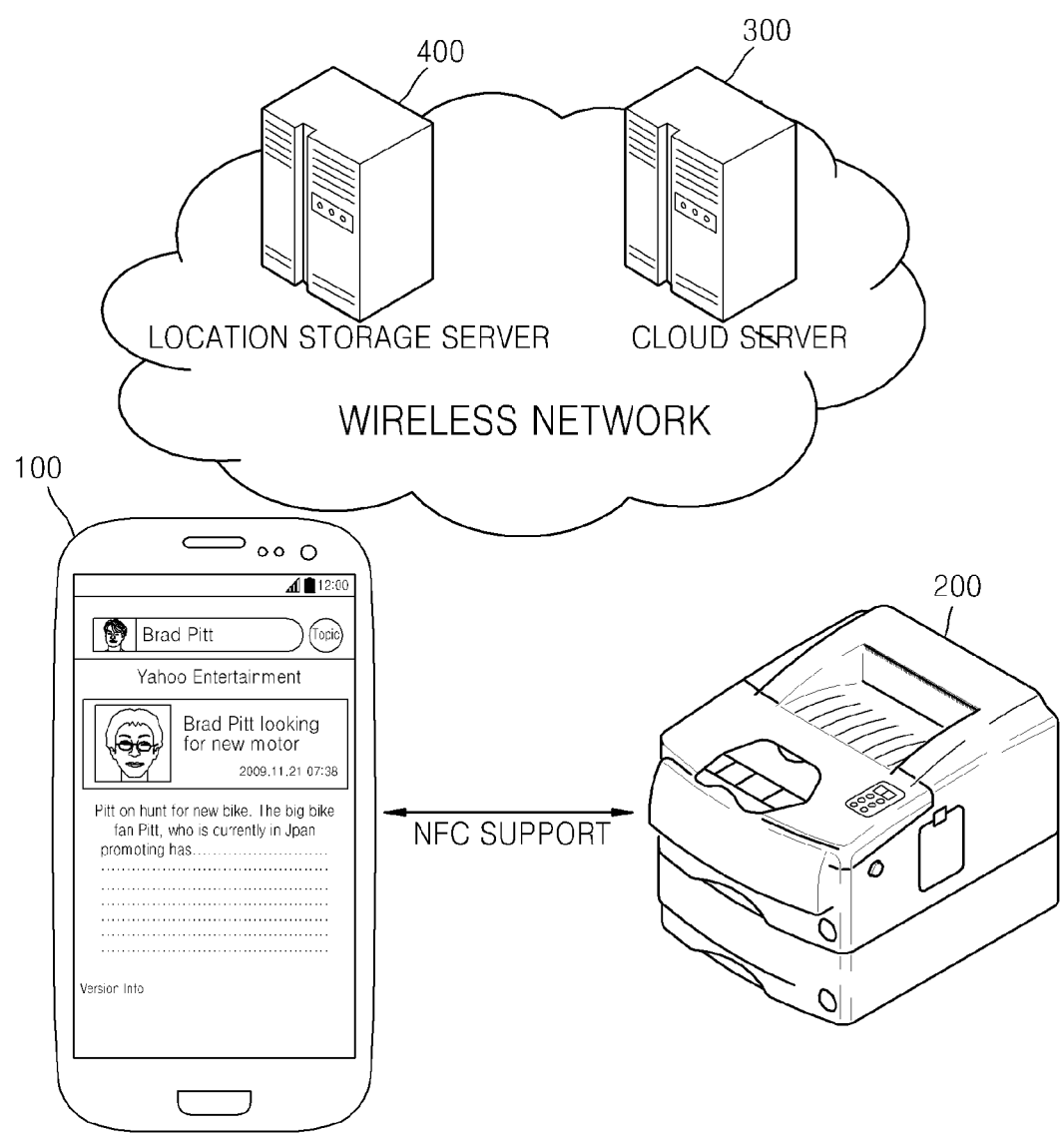
FIG. 1 is a view illustrating a cloud printing system using an image forming apparatus according to an embodiment of present invention.

Reference will now be made in detail to the embodiments, examples of which are illustrated in the accompanying drawings, wherein like reference numerals refer to the like elements throughout. The embodiments are described below to explain the present invention by referring to the figures.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a view illustrating a cloud printing system using an image forming apparatus according to an embodiment of present invention. It is understood that the image forming apparatus may be public image forming apparatus. Referring to FIG. 1, the cloud printing system using the image forming apparatus according to an embodiment of the present invention may include a mobile terminal 100, a public multi-function printer 200, a cloud server 300, and a location storage server 400. The mobile terminal 100, the cloud server 300, and the location storage server 400, may be connected by a wireless network, and, the cloud server 300 and the public multi-function printer 200 may be connected by a wireless network. The mobile terminal 100 and the public multi-function printer 200 support near field communication (NFC).

The mobile terminal 100 may be an information processing terminal that may perform wireless communications, such as cellular phones, tablet personal computers (PCs), or personal digital assistants (PDAs). The public multi-function printer 200 may be replaced by any kind of an image forming apparatus that has a print function, including a printer.

The NFC that the mobile terminal 100 and the public multi-function printer 200 support may be active NFC or passive NFC, and, the mobile terminal 100 and the public multi-function printer 200 may include at least one of an NFC chip, an NFC tag, and an NFC reader. Hereinafter, it will be supposed that the mobile terminal 100 includes the NFC chip and the public multi-function printer 200 includes the NFC tag in which information necessary for cloud printing is stored, so that the passive NFC is performed between the mobile terminal 100 and the public multi-function printer 200. Here, in the NFC tag, apparatus information of the public multi-function printer 200, such as a MAC address and the name of the device, is stored.

The location storage server 400 stores location information of the public multi-function printers 200 and provides the information when the mobile terminal 100 requests the information. Although FIG. 1 illustrates that there is one public multi-function printer 200, the cloud printing system may include a plurality of the public multi-function printers 200. Before performing printing, users may identify locations of the public multi-function printers 200 existing around via the mobile terminal 100. Accordingly, users may easily identify the public multi-function printer 200 that is in the most convenient location for the users to use. However, it is understood that it is not limited to a public printer.

When the users identify the locations of the public multi-function printers 200 via the mobile terminal 100 and select the public multi-function printer 200 for performing printing, the mobile terminal 100 transmits content for printing to the cloud server 300. The cloud server 300 renders the received content and puts the rendered content on standby for pull printing. When the users move to the location of the public multi-function printer 200 and NFC tags the mobile terminal 100 to the public multi-function printer 200, the public multi-function printer 200 pull prints the content stored in the cloud server 300.

According to the cloud printing system illustrated in FIG. 1, users may easily search for a location of the public multi-function printer 200 that is near via the mobile terminal 100. In addition, since processes including content rendering and print preparation are performed during the time that the users move to selected public multi-function printer 200, printing may be directly performed when the users arrive at the selected public multi-function printer 200.

Hereinafter, operations of a cloud printing method using a public image forming apparatus according to an embodiment of the present invention will be described in detail, in reference to FIGS. 2A through 2E.

FIGS. 2A through 2E are views illustrating the operations of the could printing method using the public image forming apparatus according to an embodiment of the present invention.

Figure 2A:
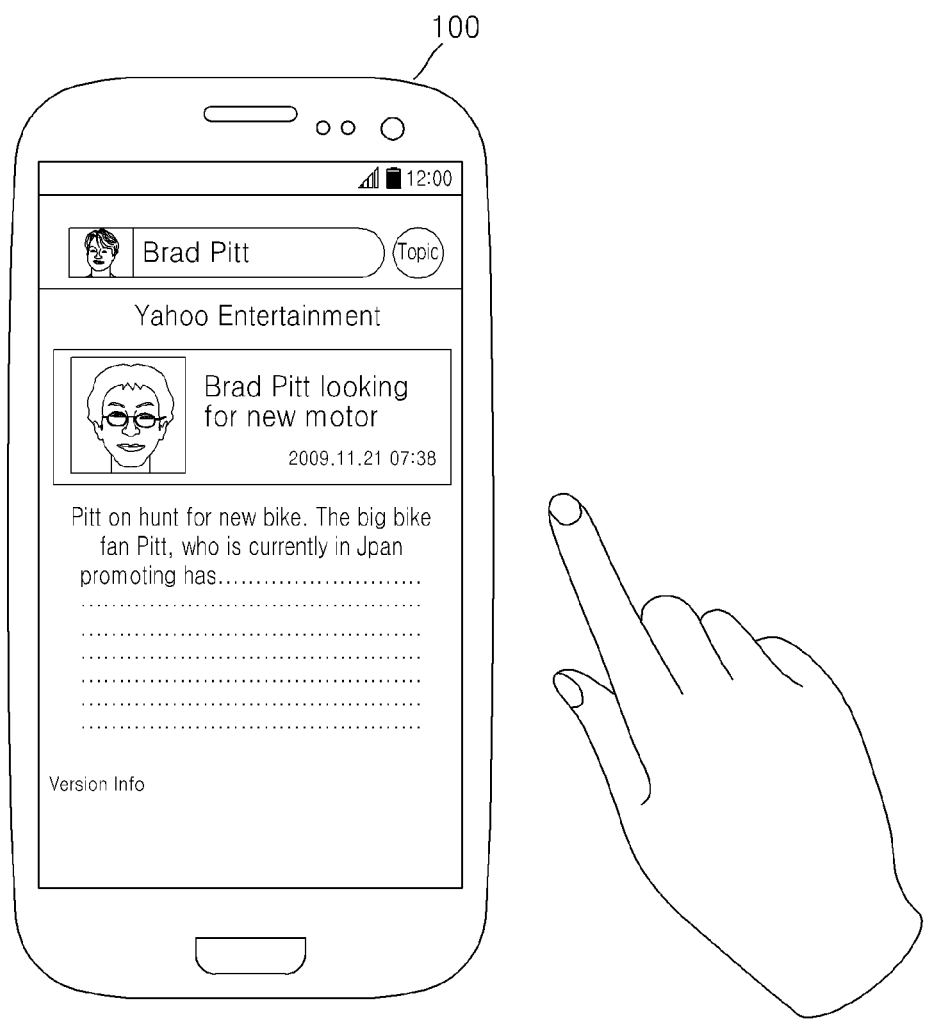

FIG. 2A is a view illustrating an operation of selecting content for printing in the mobile terminal 100, according to an embodiment of the present invention. Users may select to print any one of a text and an image of content stored in the mobile terminal 100. Also, the users may identify content stored in the cloud server 300 on a screen of the mobile terminal 100 and request a print. Furthermore, the users may select a web page displayed through a web browser of the mobile terminal 100 as the content for printing. Hereinafter, a case in which any one of the text and the image of the content stored in the mobile terminal 100 is selected and printed, will be described.

Figure 2B:
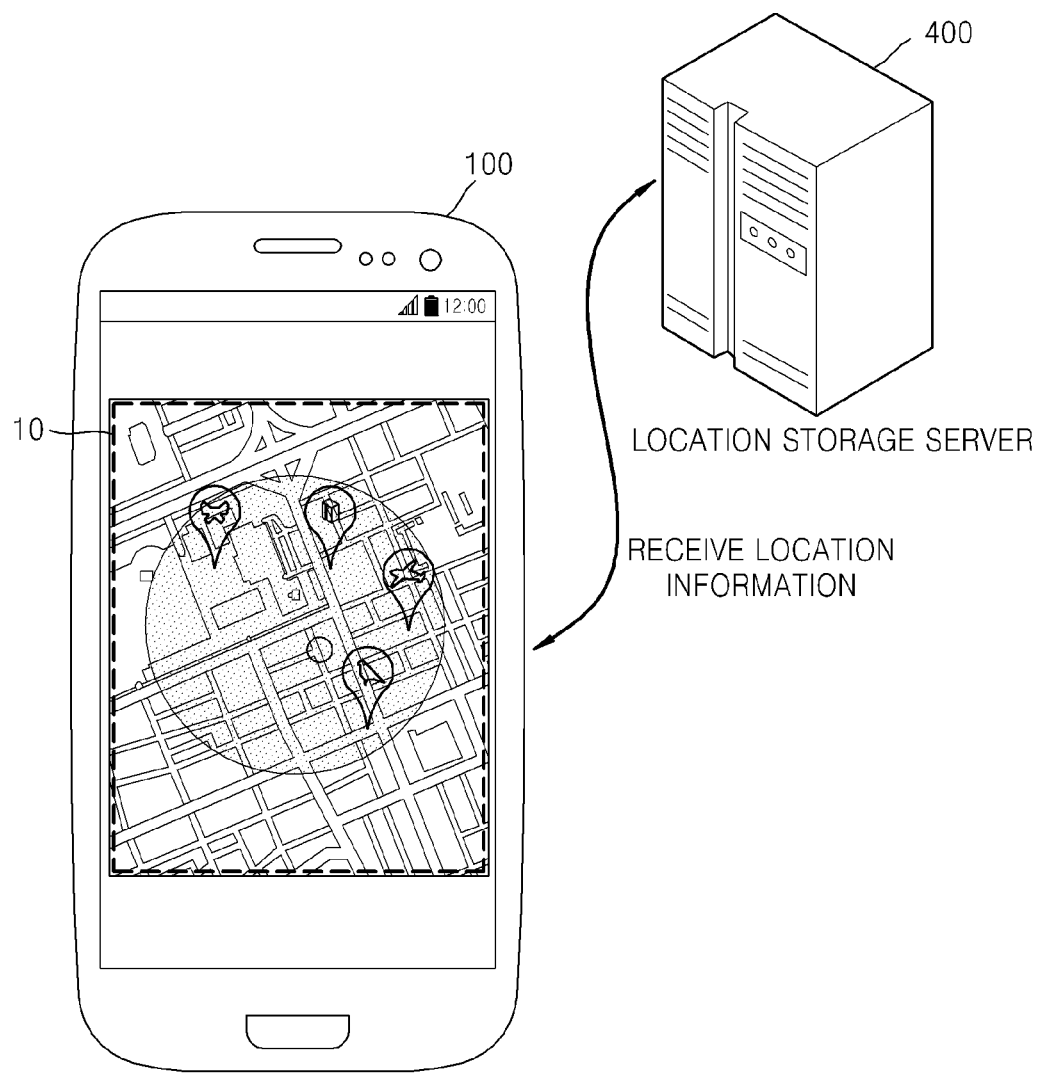

FIG. 2B is a view illustrating an operation of displaying locations of public multi-function printers 200 on a screen of the mobile terminal 100, according to an embodiment of the present invention. Referring to FIG. 2B, the mobile terminal 100 may connect the location storage server 400, receive location information of the public multi-function printers 200, and display the locations of the public multi-function printers 200 on a map 10 based on the received location information.

FIG. 2C is a view illustrating an operation of transmitting the content for printing to the cloud server 300 via the mobile terminal 100, according to an embodiment of the present invention. Referring to FIG. 2C, the cloud server 300 may include three servers that perform specific functions. In detail, the cloud server 300 may include an email server 310, a rendering server 320, and a pull print server 330.

When the mobile terminal 100 transmits an email including the content for printing to the email server 310, the email server 310 transmits the content included in the received email to the rendering server 320. The rendering server 320 performs rendering of the content received from the email server 310, and, after the rendering has been completed, transmits the content to the pull print server 330. The pull print server 330 stores the received content and puts the content on standby for pull printing.

Since content transmission and rendering are performed during the time that users move to a public multi-function printer 200 of which the users identify the location via the mobile terminal 100, a printing time may be reduced.

The cloud server 300 may be embodied in the form including the above three servers, or in a form in which one server performs the functions of all three servers above.

Figure 2D:
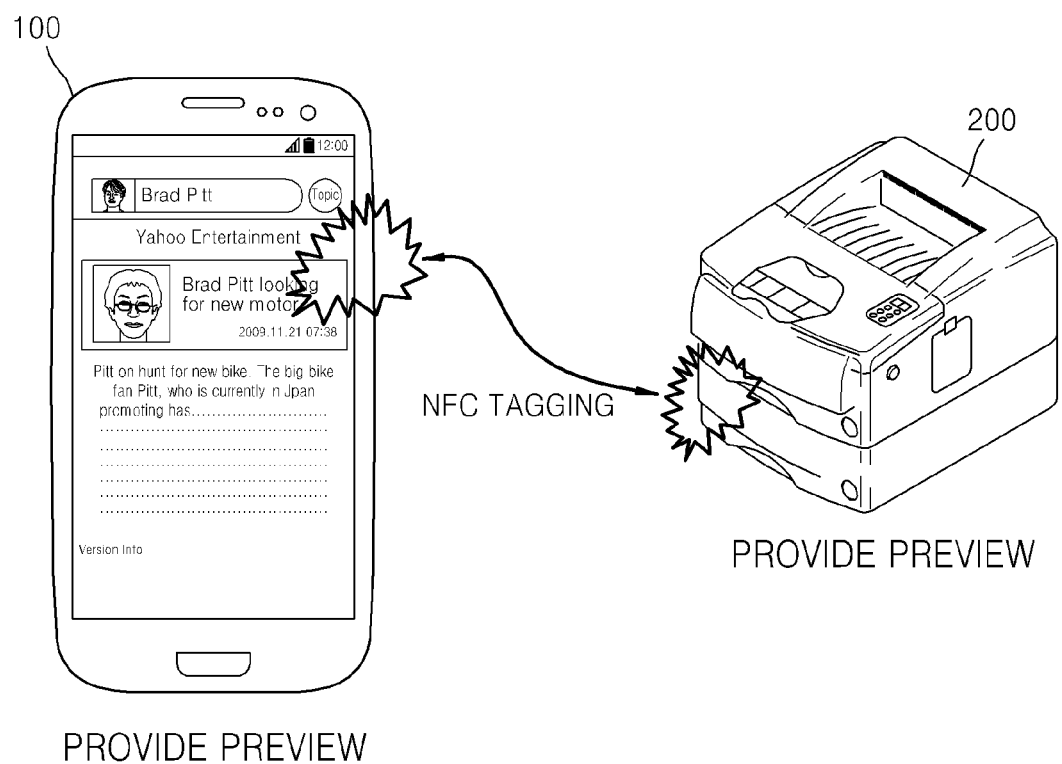

FIG. 2D is a view illustrating an operation of the mobile terminal 100 being NFC tagged to the public multi-function printer 200, according to an embodiment of the present invention. Users may request a pull print by moving to a location of the public multi-function printer 200 of which the users identify the location, being in possession of the mobile terminal 100, and by NFC tagging the mobile terminal 100 to the public multi-function printer 200. When the NFC tagging is performed, either one of the mobile terminal 100 and the one of the public multi-function printers 200 provides a preview of the content stored in the pull print server 330. The users may determine whether or not to finally perform printing by identifying the preview displayed on the mobile terminal 100 or the one of the public multi-function printers 200.

Meanwhile, when the mobile terminal 100 is NFC tagged to the public multi-function printer 200, the mobile terminal 100 may obtain apparatus information, such as a MAC address and a device name of the public multi-function printer 200, stored in the NFC tag of the public multi-function printer 200. The mobile terminal 100 may transmit the obtained apparatus information to the pull print server 330, and, the pull print server 330 may identify the public multi-function printer 200 for performing printing by analyzing the apparatus information.

Figure 2E:
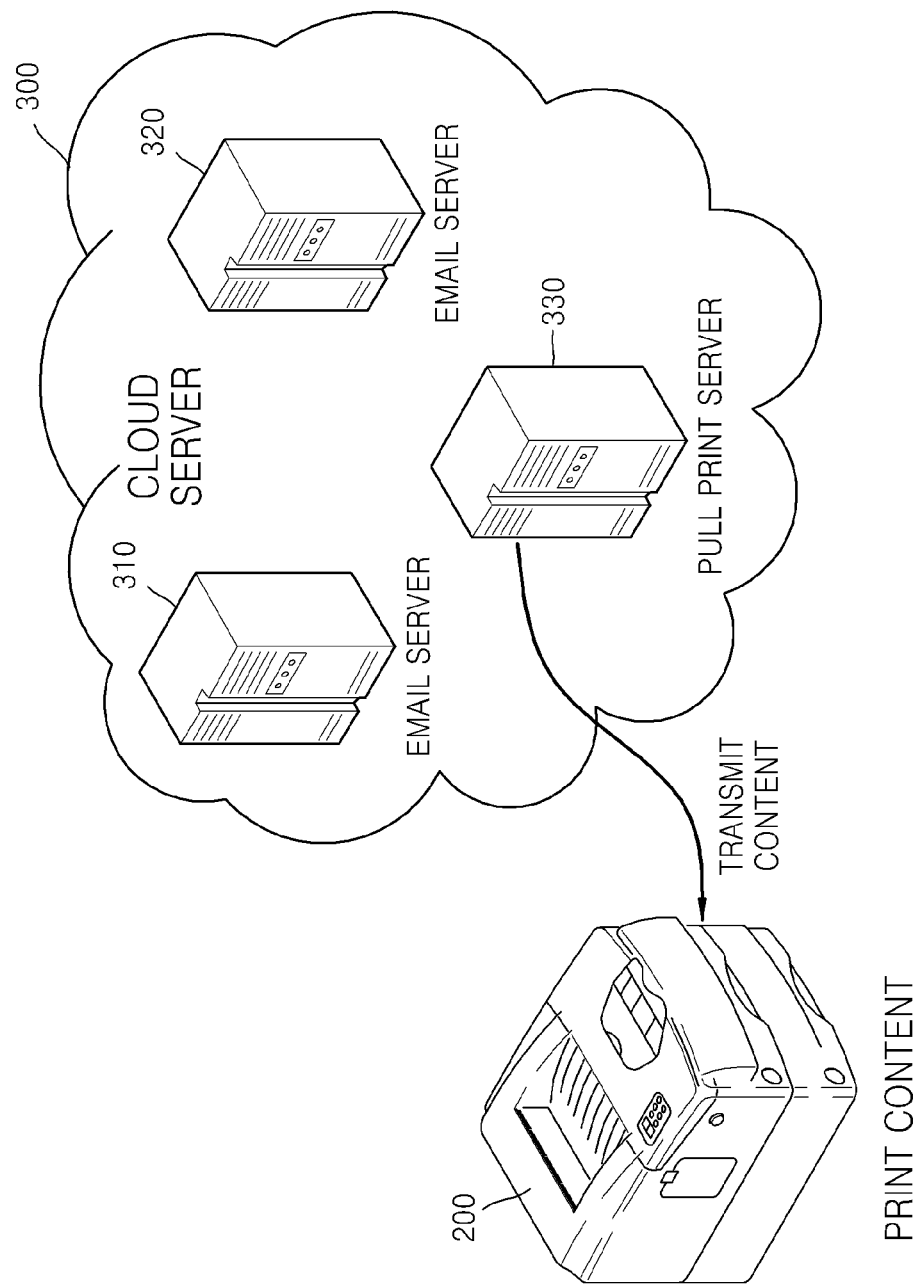

FIG. 2E is a view illustrating an operation of pull printing the content stored in the pull print server 330 via the public multi-function printer 200, according to an embodiment of the present invention. Referring to FIG. 2E, when users confirm the preview, the pull print server 330 transmits the content to the NFC tagged public multi-function printer 200, and, the public multi-function printer 200 prints the received content.

Like this, by displaying locations of the public multi-function printers 200 in the mobile terminal 100, users may easily search for a location of the public multi-function printer 200 that is near, move to the public multi-function printer 200 of which the users identify the location, and NFC tag the mobile terminal 100 to the public multi-function printer 200. As such, the users may easily perform printing.

Figure 4:
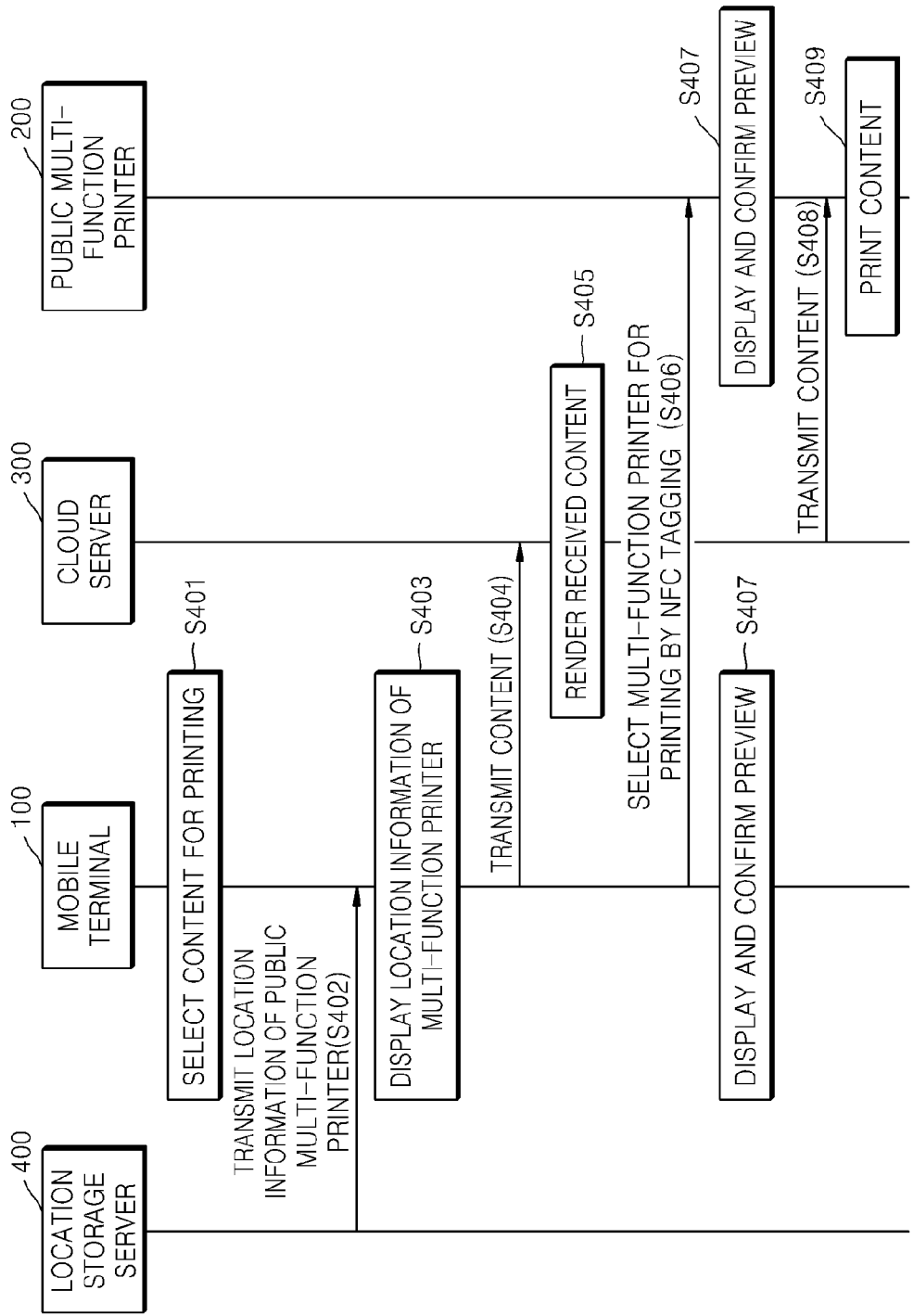

FIGS. 3 and 4 are views illustrating operations of components included in the cloud printing system using the public image forming apparatus according to embodiments of the present invention. it is understood that the image forming apparatus may be a private printer.

Referring to FIG. 3, in operation S301, the content for printing is selected in the mobile terminal 100. Here, users may select to print any one of the text and the image of content stored in the mobile terminal 100. Also, the users may identify content stored in the cloud server 300 on the screen of the mobile terminal 100 and request a print. Moreover, the users may select a web page displayed through a web browser of the mobile terminal 100 as the content for printing. Hereinafter, a case in which any one of the text and the image of the content stored in the mobile terminal 100 is selected and printed, will be described.

In operation 302, the mobile terminal 100 receives location information of the public multi-function printers 200 from the location storage server 400, and in operation 303, the mobile terminal 100 displays locations of the public multi-function printers 200 on the screen based on the received location information. For example, the mobile terminal 100 may display the map 10 on the screen of the mobile terminal 100, and display the locations of the public multi-function printers 200 on the map 10.

In operation S304, the mobile terminal 100 receives an input of a selection of the public multi-function printer 200 for printing from the users. The users may identify the locations of the public multi-function printers 200 displayed in the mobile terminal 100 and select one of the public multi-function printers 200 that is located most near to the users or in users' moving routes as an apparatus for performing printing.

Meanwhile, the mobile terminal 100 may select the public multi-function printer 200 also by directly moving to the public multi-function printer 200 that the users intend to use and performing the NFC tagging, after requesting a print without selecting the one of the public multi-function printers 200. The embodiment with respect to this is illustrated in FIG. 4.

In operation S305, the mobile terminal 100 transmits the content for printing to the cloud server 300, and, in operation S306, the cloud server 300 renders the received content and puts the rendered content on standby for pull printing.

In detail, the cloud server 300 may include the email server 310, the rendering server 320, and the pull print server 330. The email server 310 may receive an email including the content from the mobile terminal 100 and transmit the received content to the rendering server 320. The rendering server 320 may perform rendering of the content and transmit the rendered content to the pull print server 330. The pull print server 330 may store the rendered content and put the content on standby for pull printing.

In operation S307, the users approach to the public multi-function printer 200 that the users intend to use, and the NFC tags the mobile terminal 100 that the users are in possession of to the public multi-function printer 200. Here, by the NFC tagging, the mobile terminal 100 may receive the apparatus information of the public multi-function printer 200, which is stored in the NFC tag of the public multi-function printer 200.

Then, the mobile terminal 100 may transmit the received apparatus information to the cloud server 300 so that the cloud server 300 may identify the public multi-function printer 200 for performing printing. It is understood that the multi-function printer is not limited to the public multi-function printer. It can be a private multi-function printer.

In operation S308, the mobile terminal 100 and/or the public multi-function printer 200 may display the preview of the content stored in the cloud server 300, and receive an input of a confirmation of the preview from the users.

When the users confirm the preview, the cloud server transmits the stored content to the public multi-function printer 200 in operation S309, and, the public multi-function printer 200 prints the received content in operation S310.

The embodiment illustrated in FIG. 4 is different from the embodiment illustrated in FIG. 3 only in that the public multi-function printer 200 is not selected in the mobile terminal 100 and in operation S406, the public multi-function printer 200 for performing printing is selected by the mobile terminal 100 being NFC tagged to the public multi-function printer 200. Other operations of the embodiment illustrated in FIG. 4 than this are identical with the embodiment illustrated in FIG. 3. Thus, detailed descriptions about the operations will be omitted.

FIGS. 5 through 9 are flowcharts illustrating the operations of the cloud printing method using the public multi-function printer 200 according to embodiments of the present invention.

Figure 5:
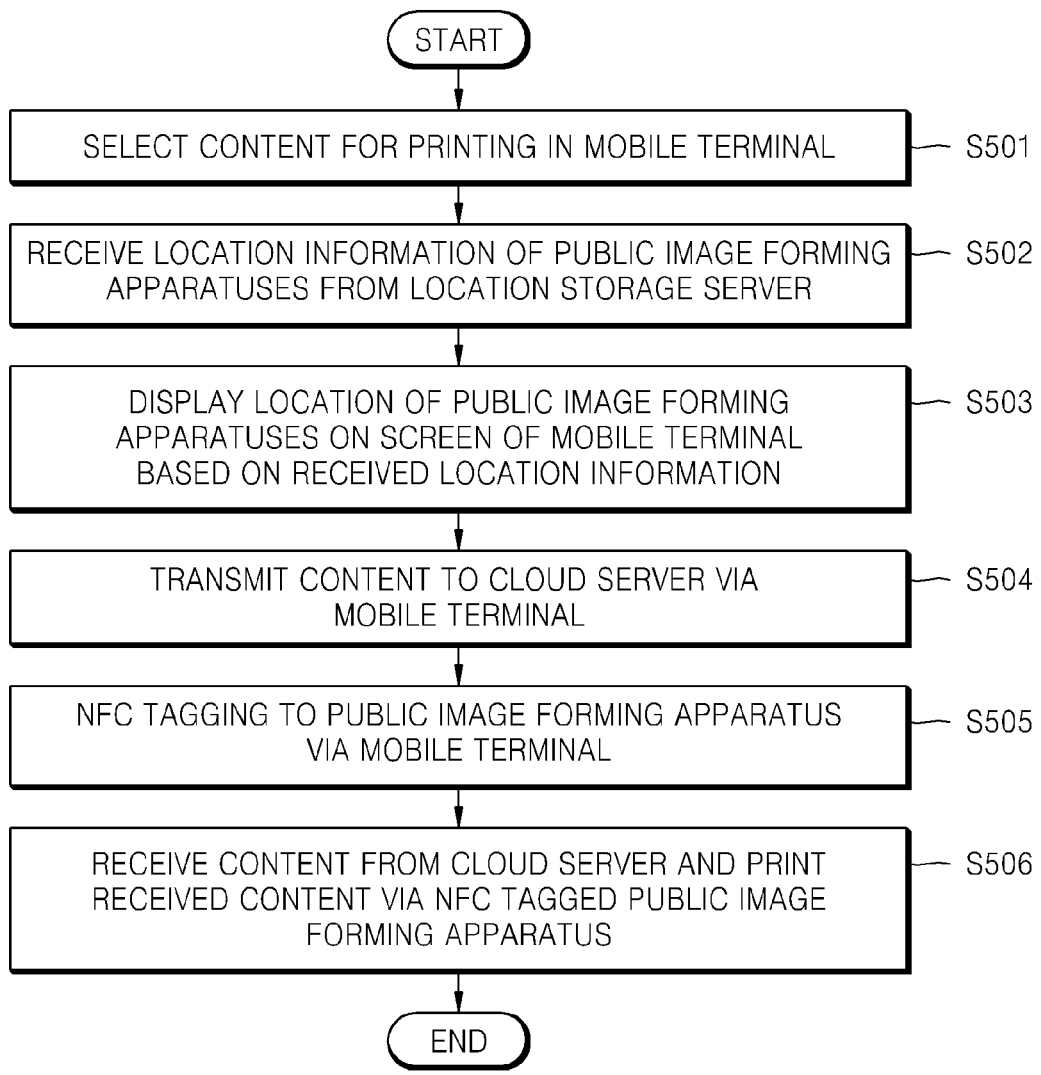
FIGS. 5 through 9 are flowcharts illustrating operations of a cloud printing method using a image forming apparatus according to embodiments of the present invention.

Referring to FIG. 5, in operation S501, the content for printing is selected by users in the mobile terminal 100. When the mobile terminal 100 receives the location information of the public image forming apparatuses from the location storage server 400 in operation S502, the mobile terminal 100 displays locations of the public image forming apparatuses on the screen of the mobile terminal 100, based on the received location information, in operation S503. For example, the mobile terminal 100 may display the map 10 on which the locations of the public image forming apparatuses are displayed, on the screen of the mobile terminal 100.

Figure 6:
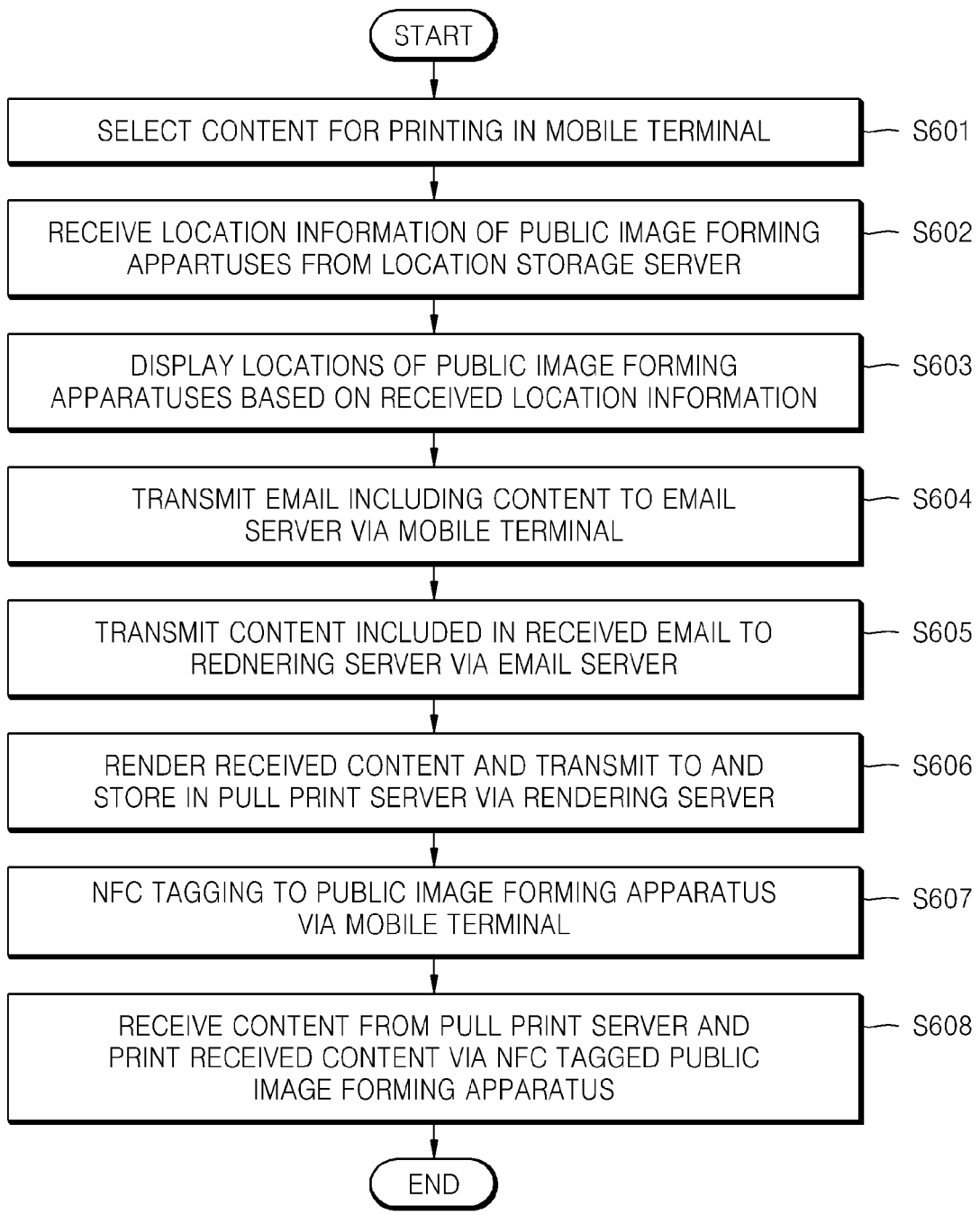

In operation S504, the mobile terminal 100 transmits the content selected in operation S501 to the cloud server 300. The cloud server 300 may render the received content and put the rendered content on standby for pull printing. Here, the cloud server 300 may include the email server 310, the rendering server 320, and the pull print server 330. The embodiment according to this is illustrated in FIG. 6. Detailed aspects will be referred to in FIG. 6 below.

Next, in operation S505, the mobile terminal 100 is NFC tagged to the public image forming apparatus. The users may move to a location of the public image forming apparatus of which the users identify the location in the mobile terminal 100, and NFC tag the mobile terminal 100 of which the users are in possession to the public image forming apparatus. When the NFC tagging is performed, the NFC tagged public image forming apparatus receives the content from the cloud server 300 and prints printing, in operation S506.

FIG. 6 is a flowchart illustrating an embodiment according to which the cloud server 300 includes the email server 310, the rendering server 320, and the pull print server 330.

Referring to FIG. 6, operations S601 through S603 are identical with operations S501 through S503 of FIG. 5. Thus, detailed descriptions with respect to operations S601 through S603 will be omitted. In operation S604, the mobile terminal 100 transmits the email including the content for printing to the email server 310. In operation S605, the email server 310 transmits the content included in the received email to the rendering server 320. In operation S606, the rendering server 320 renders the received content, and transmits the rendered content to the pull print server 330 for storing. The pull print server 330 stores the received content and puts the content on standby for pull printing.

When the mobile terminal 100 is NFC tagged to the public image forming apparatus in operation S607, the NFC tagged public image forming apparatus receives the content from the pull print server 330 and performs printing, in operation S608.

Figure 7:
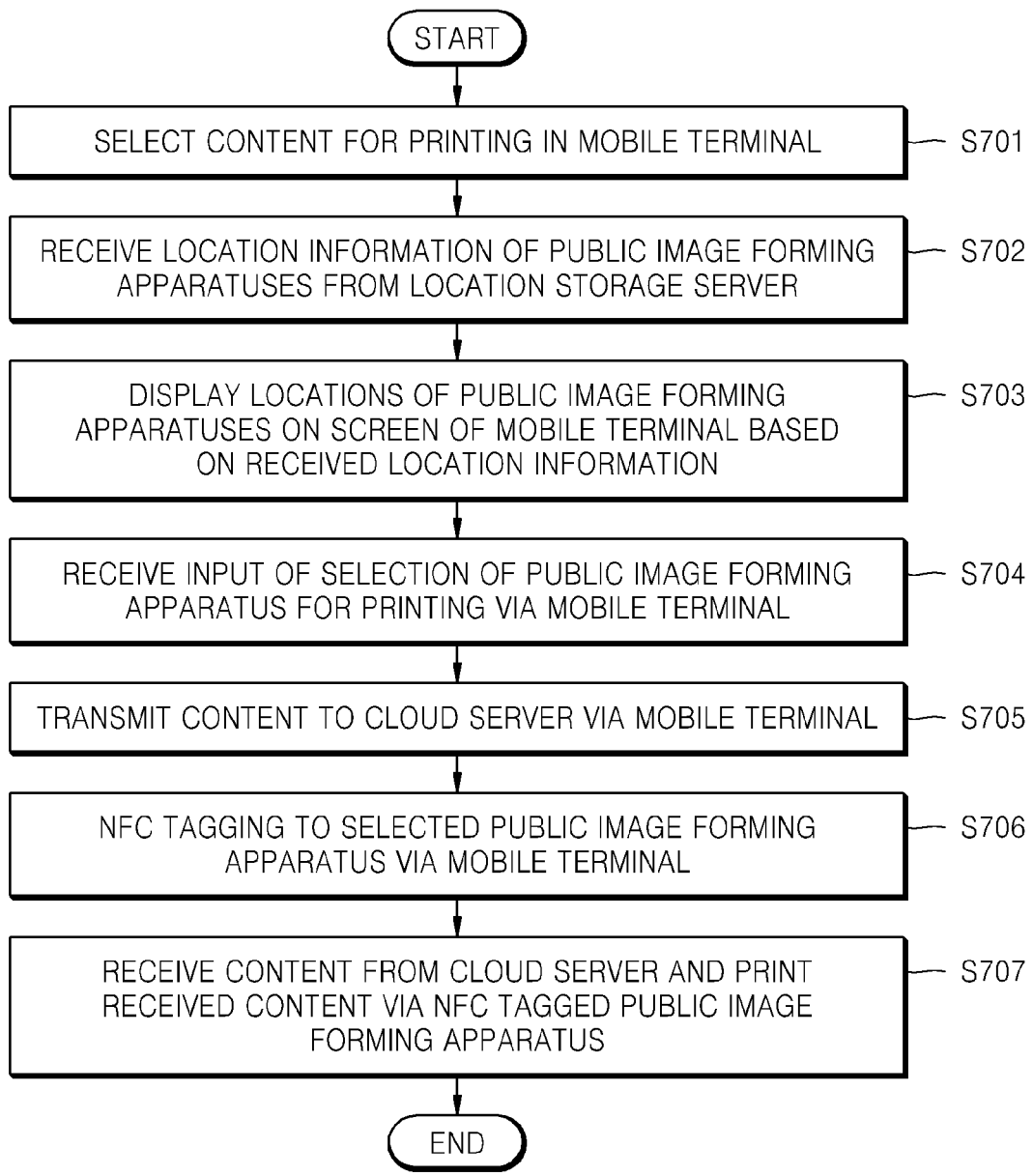

Referring to FIG. 7, in operation S701, the content for printing is selected in the mobile terminal 100. The mobile terminal 100 receives the location information of the public image forming apparatuses from the location storage server 400 in operation S702. In operation S703, the mobile terminal 100 displays the locations of the public image forming apparatuses on the screen based on the location information received in operation S701.

In operation S704, the mobile terminal 100 receives from the users the input of the selection of the public image forming apparatus for performing printing among the public image forming apparatuses the locations of which are displayed on the screen. When the mobile terminal 100 transmits the content to the cloud server 300 in operation S705, the cloud server 300 stores the content after the rendering, and puts the content on standby for pull printing.

When, in operation S706, the mobile terminal 100 is NFC tagged to the public image forming apparatus selected in operation S704, the NFC tagged public image forming apparatus receives the content from the cloud serer 300 and prints the received content, in operation S707.

Figure 8:
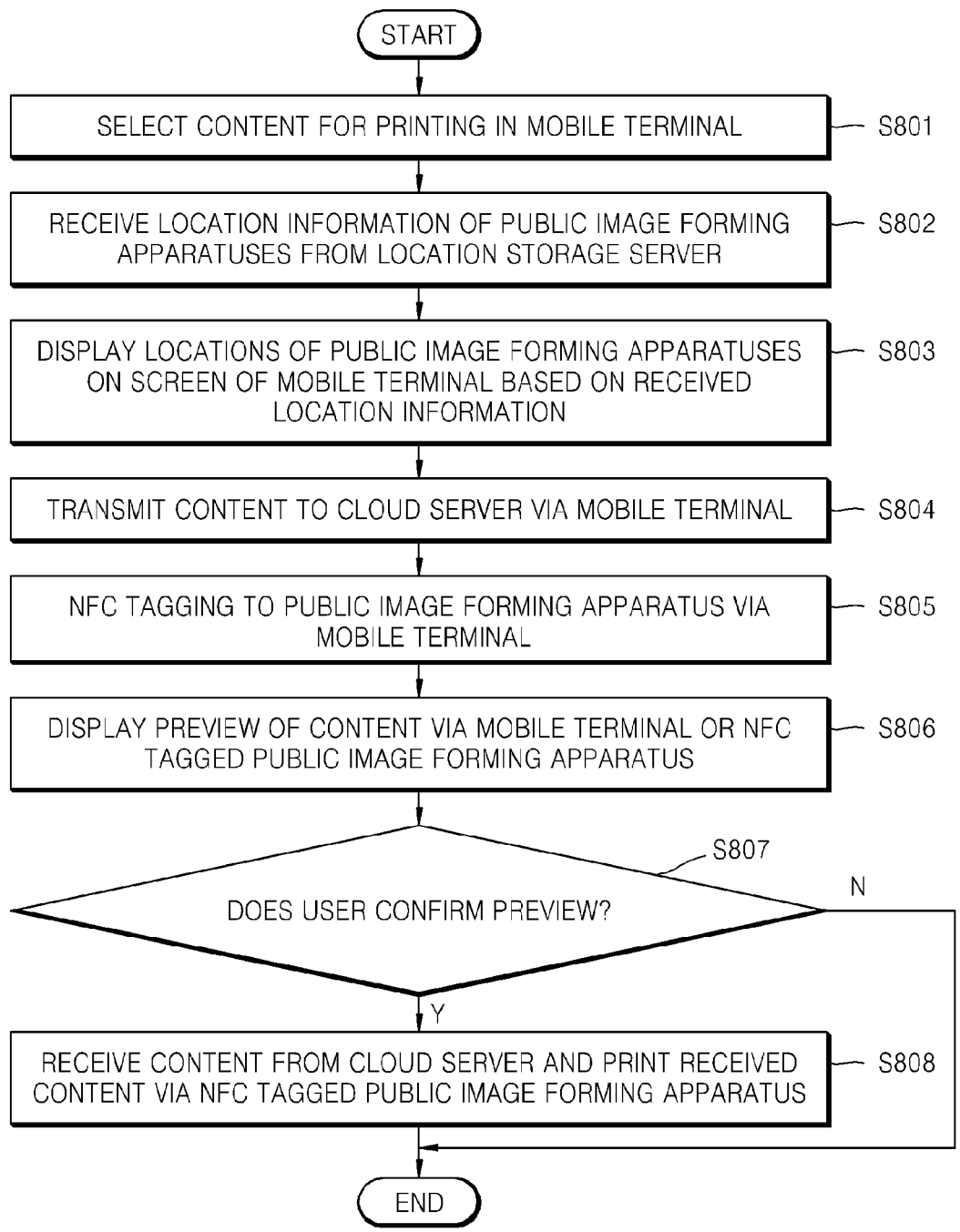

Referring to FIG. 8, in operation S801, the content for printing is selected in the mobile terminal 100. In operation S802, the mobile terminal 100 receives the location information of the public image forming apparatuses from the location storage server 400. In operation S803, the mobile terminal 100 displays the locations of the public image forming apparatuses on the screen based on the received location information.

When the mobile terminal 100 transmits the content to the cloud server 300 in operation S804, the cloud server 300 stores the content after the rendering and puts the content on standby for pull printing. When the mobile terminal 100 is NFC tagged to the image forming apparatus in operation S805, the mobile terminal 100 or the NFC tagged image forming apparatus displays the preview of the content stored in the cloud server 300, in operation S806.

In operation S807, it is determined whether or not the users confirm the preview. When the users confirm the preview, it proceeds to operation S808 in which the NFC tagged public image forming apparatus receives the content from the cloud server 300 and prints the received content. However, if the users do not confirm the preview in operation S807, the process is completed.

Figure 9:
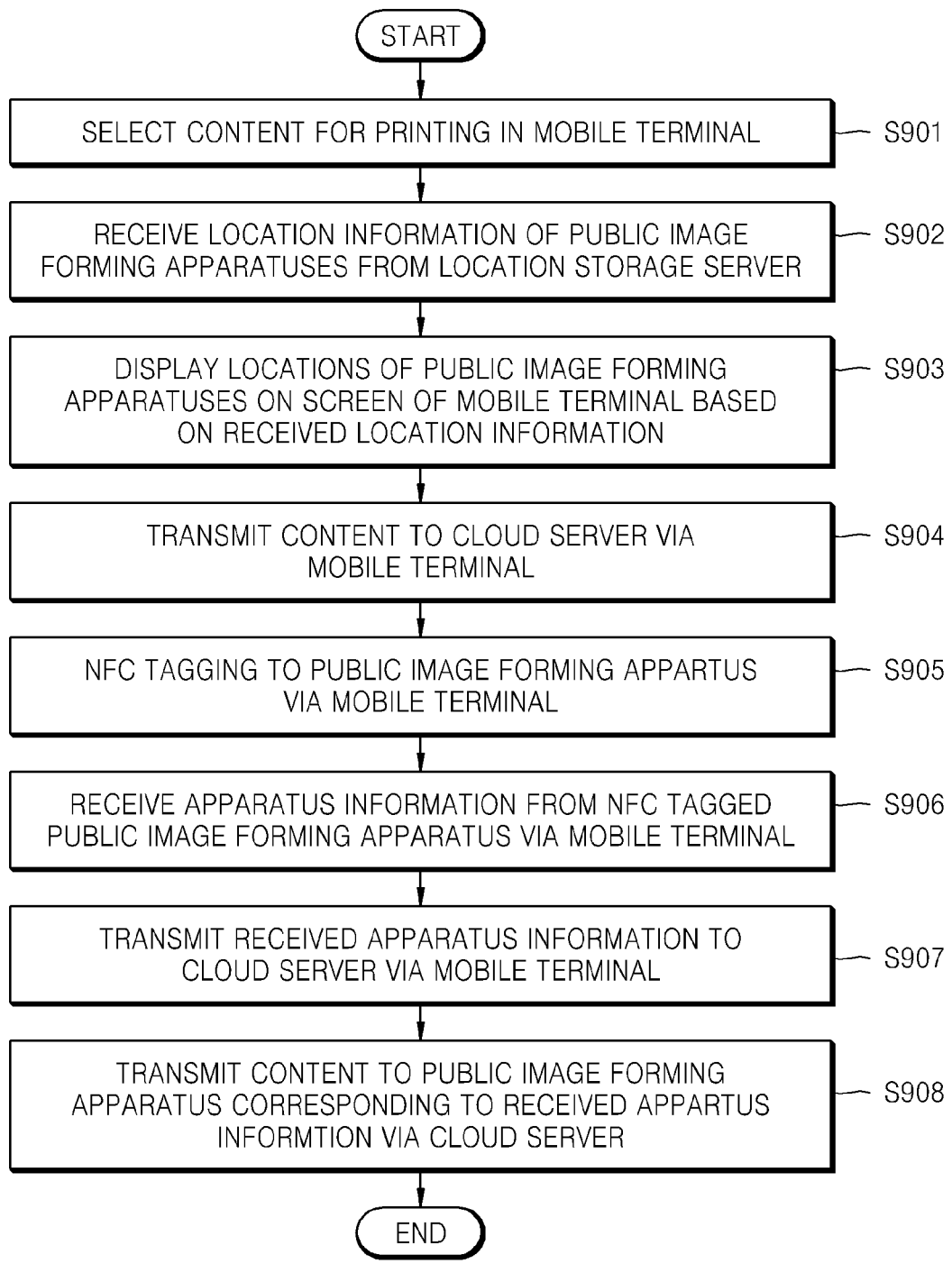

Referring to FIG. 9, in operation S901, the content for printing is selected in the mobile terminal 100. In operation S902, the mobile terminal 100 receives the location information of the public image forming apparatuses from the location storage server 400. In operation S903, the mobile terminal 100 displays the locations of the public image forming apparatuses on the screen based on the received location information.

When the mobile terminal 100 transmits the content to the cloud server 300 in operation S904, the cloud server 300 stores the content after the rendering and puts the content on standby for pull printing. When the mobile terminal 100 is NFC tagged to the public image forming apparatus in operation S905, the mobile terminal 100 receives the apparatus information from the NFC tagged public image forming apparatus in operation S906. That is, by the NFC tagging, the mobile terminal 100 receives the apparatus information stored in the NFC tag of the public image forming apparatus. In operation S907, the mobile terminal 100 transmits the received apparatus information to the cloud server 300. In operation S908, the cloud server identifies the corresponding public image forming apparatus by analyzing the received apparatus information, and transmits the content to the public image forming apparatus corresponding to the apparatus information for printing.

Like this, by displaying the locations of the public multi-function printers 200 in the mobile terminal 100, the users may easily search for the location of the public multi-function printer 200 that is near, move to the public multi-function printer 200 of which the users identify the location, and NFC tag the mobile terminal 100 to the public multi-function printer 200. As such, the users may easily perform printing.

It is understood that the multi-function printer is not limited to the public multi-function printer. It can be a private multi-function printer.

As described above, according to the one or more of the above embodiments of the present invention, user convenience may be increased by displaying the locations of the public printers on the screen of the mobile terminal so that the users may identify the locations, and by making pull printing available by a simple operation of NFC tagging the mobile terminal 100 to the public printer. Furthermore, the printing time may be reduced by rendering the content and putting the content on standby for pull printing, during the time that the users move to the public printer after requesting the print.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A cloud printing method using an image forming apparatus among plural image forming apparatuses, the method comprising:
   selecting content for printing in a mobile terminal;
   connecting a location storage server storing location information of image forming apparatuses via the mobile terminal;
   displaying locations of the image forming apparatuses on a screen of the mobile terminal, based on the location information;
   transmitting the content selected for printing to a cloud server via the mobile terminal;
   near field communication (NFC) tagging the mobile terminal to one of the image forming apparatuses; and
   receiving the content from the cloud server and printing the content via the NFC tagged image forming apparatus,
   wherein the cloud server comprises an email server, a rendering server, and a pull print server.

2. The method of claim 1,
   wherein the transmitting of the content comprises transmitting an email including the selected content to the email server.

3. The method of claim 2, wherein the rendering server receives the content included in the email from the email server, performs rendering of the received content, and transmits the rendered content to the pull print server.

4. The method of claim 3, wherein the pull print server receives the rendered content from the rendering server and stores the rendered content.

5. The method of claim 4, wherein the receiving and printing of the content comprises receiving the rendered content which is stored in the pull print server and printing the rendered content, via the NFC tagged image forming apparatus.

6. The method of claim 5, wherein the receiving and printing of the content comprises:
   receiving apparatus information coming from the NFC tagged image forming apparatus via the mobile terminal;
   transmitting the received apparatus information to the pull print server via the mobile terminal; and
   transmitting the rendered content to the image forming apparatus that corresponds to the received apparatus information via the pull print server.

7. The method of claim 1, wherein the transmitting of the content comprises transmitting the content to the could server via the mobile terminal, when the one of the image forming apparatuses displayed on the screen of the mobile terminal is selected as an apparatus for performing printing.

8. The method of claim 1, wherein the receiving and printing of the content comprises:
   displaying a preview of the content in the mobile terminal and/or the NFC tagged image forming apparatus;
   transmitting the content to the NFC tagged image forming apparatus via the cloud server, when an input of a confirmation of the preview is received from a user; and
   printing the content via the NFC tagged image forming apparatus.

9. The method of claim 1, wherein the displaying location information is in a form of a map.

10. The method of claim 1, wherein the image apparatus is a public image apparatus.

11. A non-transitory computer readable medium having embodied thereon a program for executing the method of claim 1.

12. A cloud printing system using an image forming apparatus among plural image forming apparatuses, the system comprising:
   a plurality of image forming apparatuses that support near field communication (NFC) and are for printing content received from a cloud server;
   a location storage server in which location information of the plurality of image forming apparatuses is stored;
   a mobile terminal that supports the NFC and is for receiving location the information of the plurality of image forming apparatuses from the location storage server and displaying the location information on a screen; and
   the cloud server that renders and stores the content from the mobile terminal,
   wherein, when the mobile terminal is NFC tagged to one of the plurality of image forming apparatuses, the cloud server transmits the content to the NFC tagged image forming apparatus,
   wherein the cloud server comprises an email server, a rendering server, and a pull print server.

13. The system of claim 12,
wherein the mobile terminal transmits the email including the content to the email server.

14. The system of claim 13, wherein the rendering server receives the content included in the email from the email server, performs rendering of the received content, and transmits the rendered content to the pull print server.

15. The system of claim 14, wherein the pull print server receives the rendered content from the rendering server and stores the rendered content.

16. The system of claim 15, wherein the NFC tagged image forming apparatus receives and prints the rendered content which is stored in the pull print server.

17. The system of claim 16, wherein the mobile terminal receives apparatus information coming from the NFC tagged image forming apparatus and transmits the received apparatus information to the pull print server, and, the pull print server transmits the rendered content to the image forming apparatus that corresponds to the received apparatus information.

18. The system of claim 12, wherein the mobile terminal receives an input for selecting an image forming apparatus for performing printing among the plurality of image forming apparatuses displayed on its screen.

19. The system of claim 12, wherein either of the mobile terminal and the NFC tagged image forming apparatus displays a preview of the content, and, when an input of a confirmation of the preview is received from a user, the NFC tagged image forming apparatus receives the content from the cloud server and prints the content.

20. A cloud printing method using Near Field Communication (NFC), the method comprising:
receiving location information of image forming apparatuses;
displaying locations of the image forming apparatuses on a screen of the mobile terminal, based on the received location information;
connecting a location storage server;
selecting content for printing in a mobile terminal;
transmitting the content to a cloud server from the mobile terminal;
NFC tagging the mobile terminal to one of the image forming apparatuses; and
sending a command to the cloud server for transmitting the content to the one of the NFC tagged image forming apparatus,
wherein the cloud server comprises an email server, a rendering server, and a pull print server.

* * * * *